US011876321B2

(12) United States Patent
Scharnreithner et al.

(10) Patent No.: US 11,876,321 B2
(45) Date of Patent: Jan. 16, 2024

(54) PLUG CONNECTING ELEMENT FOR A MOTOR VEHICLE AND METHOD FOR PRODUCING A PLUG CONNECTING ELEMENT OF THIS TYPE

(71) Applicant: Bayerische Motoren Werke Aktiengesellschaft, Munich (DE)

(72) Inventors: Christian Scharnreithner, Weyer (AT); Matthias Schmid, Weiden i. d. Oberpfalz (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 216 days.

(21) Appl. No.: 17/053,113

(22) PCT Filed: Jun. 5, 2019

(86) PCT No.: PCT/EP2019/064561

§ 371 (c)(1),
(2) Date: Nov. 5, 2020

(87) PCT Pub. No.: WO2020/007555

PCT Pub. Date: Jan. 9, 2020

(65) Prior Publication Data

US 2021/0313737 A1 Oct. 7, 2021

(30) Foreign Application Priority Data

Jul. 3, 2018 (DE) ..................... 10 2018 210 892.7

(51) Int. Cl.
*H01R 13/52* (2006.01)
*H01R 13/405* (2006.01)
(Continued)

(52) U.S. Cl.
CPC ....... *H01R 13/5219* (2013.01); *H01R 13/405* (2013.01); *H01R 13/631* (2013.01);
(Continued)

(58) Field of Classification Search
CPC .. H01R 13/40; H01R 13/405; H01R 13/5219; H01R 13/631; H01R 13/73; H01R 43/24; H01R 2201/26
See application file for complete search history.

(56) References Cited

U.S. PATENT DOCUMENTS 6,224,397 B1 * 5/2001 Nakamura ............... H01R 9/24 439/949
6,783,396 B1 * 8/2004 Osterhart ................. H02G 3/22 439/587
(Continued)

FOREIGN PATENT DOCUMENTS

CN 107425332 A 12/2017
DE 198 37 314 A1 3/2000
(Continued)

OTHER PUBLICATIONS

International Search Report (PCT/ISA/210) issued in PCT Application No. PCT/EP2019/064561 dated Sep. 11, 2019 with English translation (four (4) pages).
(Continued)

*Primary Examiner* — Briggitte R. Hammond
(74) *Attorney, Agent, or Firm* — Crowell & Moring LLP

(57) ABSTRACT

A plug connecting element for a motor vehicle includes an electrical conduction element, to which at least one plug of an electronic component of the motor vehicle is able to be connected, and a casing element made of plastic, by way of which the conduction element is at least partially electrically insulated. The electrical conduction element is connected to the casing element in a fixed and non-releasable manner by primary forming of the plastic.

7 Claims, 3 Drawing Sheets

(51) Int. Cl.
*H01R 13/631* (2006.01)
*H01R 13/73* (2006.01)
*H01R 43/24* (2006.01)

(52) U.S. Cl.
CPC ............. *H01R 13/73* (2013.01); *H01R 43/24* (2013.01); *H01R 2201/26* (2013.01)

(56) References Cited

U.S. PATENT DOCUMENTS

| | | | | |
|---|---|---|---|---|
| 9,681,571 | B2 * | 6/2017 | Hansen | H05K 5/0026 |
| 10,014,622 | B2 * | 7/2018 | Kondo | H01R 13/521 |
| 2004/0115973 | A1 * | 6/2004 | Fujii | H01R 4/64 439/97 |
| 2005/0239326 | A1 | 10/2005 | Ishikura et al. | |
| 2018/0034182 | A1 | 2/2018 | Chuang et al. | |
| 2018/0131123 | A1 | 5/2018 | Kondo | |

FOREIGN PATENT DOCUMENTS

| | | | |
|---|---|---|---|
| DE | 102 24 478 | A1 | 5/2003 |
| DE | 10 2005 018 360 | A1 | 11/2005 |
| DE | 10 2014 213 590 | A1 | 1/2016 |
| DE | 10 2017 218 603 | A1 | 5/2018 |
| FR | 1 303 520 | A | 9/1962 |
| JP | 2004-40945 | A | 2/2004 |
| JP | 2006-114245 | A | 4/2006 |
| JP | 2006114245 | A * | 4/2006 |
| WO | WO 2012/156925 | A2 | 11/2012 |

OTHER PUBLICATIONS

German-language Written Opinion (PCT/ISA/237) issued in PCT Application No. PCT/EP2019/064561 dated Sep. 11, 2019 (five (5) pages).

German-language Search Report issued in German Application No. 10 2018 210 892.7 dated Feb. 4, 2019 with partial English translation (11 pages).

English translation of Chinese-language Office Action issued in Chinese Application No. 201980031377.4 dated Jul. 5, 2021 (eight (8) pages).

* cited by examiner

PLUG CONNECTING ELEMENT FOR A MOTOR VEHICLE AND METHOD FOR PRODUCING A PLUG CONNECTING ELEMENT OF THIS TYPE

BACKGROUND AND SUMMARY OF THE INVENTION

The invention relates to a plug connecting element for a motor vehicle. The invention further relates to a method for producing a plug connecting element for a motor vehicle.

During the manufacture, in particular series manufacture, of motor vehicles, there is a need for electronic components of the motor vehicle being manufactured to be electrically connected to a ground connection. In order to prevent there being a voltage drop between the individual ground connections, it may be provided that multiple electronic components are electrically connected to a joint ground connection. In particular, these electronic components are connected to the respective ground connection via an electrical cable network in the form of a cable harness, for example. The connecting elements via which the cable harness is to be connected to the ground connection represent a particular challenge during the production of this cable harness. So-called cable shoes and/or crimp connectors are known in the art, for example, however these require a manual process during production which represents a risk to constant or reproducible quality during series manufacture. Furthermore, crimp connectors and/or cable shoes prevent automatic processing, particularly on component placement machines, during cable harness production.

Ground bars via which a plurality of electronic components of the respective motor vehicle can be connected to a ground point of the motor vehicle are known from the prior art, in particular from series vehicle manufacture. For this purpose, it is likewise known in the art for the ground bar to be configured with plug contacts, so that the corresponding cable harness portions can be connected to this ground bar particularly easily and/or inexpensively.

Hence, for example, DE 198 37 314 A1 discloses a device for the ground connection of electrical components, in particular for motor vehicles, which comprises a bolt at ground potential that can be fastened to the vehicle body particularly in a non-detachable manner and a connection element that can be connected to the bolt in a detachable manner, to which connection element a plurality of electrical components can be connected, wherein the connection element can be connected to the bolt in a mechanically latching manner and at least part of the curved surface area of the bolt forms an electrically conducting connection to an assigned surface of the connection element.

Moreover, DE 102 24 478 A1 discloses a connection mechanism for electrical lines, in particular for a cable set between an engine gear unit and a body of a motor vehicle, which substantially comprises a plug and a socket with sets of contacts which are connected to one another by at least one fastening element, wherein at least one of the electrical lines leading to the connection mechanism is in electrical contact with the at least one fastening element, wherein the fastening element is simultaneously detachably connected in electrical contact to an electrically conductive main body in order to fix the connection mechanism.

However, these two traditional connection mechanisms are susceptible to penetration by foreign bodies or liquids, particularly at points where the electrical contact can be made, or is made, between the respective connection mechanisms and the electronic components of the motor vehicle which are thereby to be connected. As a consequence of this, there is a risk of metal components of the connection mechanism and/or the lines connected thereto corroding, as a result of which a particularly high contact resistance between the lines and the connection devices can occur. This would signify an inadequate electrical contact between the ground point and the electronic components to be connected thereto, which could lead to a malfunction of the electronic components.

The problem addressed by the invention is that of providing a particularly flexibly usable plug connecting element which is particularly reliable.

This problem is solved according to the invention by a plug connecting element and by a method for producing the plug connecting element, according to the claimed invention.

According to the invention, a plug connecting element for a motor vehicle is proposed. This plug connecting element has at least one electrical conducting element to which at least one plug of an electronic component of the motor vehicle can be connected. In addition, the plug connecting element has a casing element made of plastic, by means of which the conducting element is at least partially electrically insulated. Consequently, if an electrical voltage is applied between two points of the electrical conducting element remote from one another, then an electric current flows through the electrical conducting element between the two points. On the other hand, the plastic of the casing element is an electrically non-conductive plastic. This means that if an electrical voltage is applied to the plastic of the casing element between two points remote from one another, no electric current flows through the casing element between these two points.

It is known in the art for a plurality of electronic components to be used in a modern motor vehicle, the correct operation whereof requires a ground connection in each case. An electronic component in this context should be understood to mean a component of the motor vehicle which can be operated by means of an electrical current and/or supplies electrical energy. These include, for example, control devices, primary and secondary batteries, lighting equipment, display equipment, audio components, etc. In addition, the electronic component may be configured as an engine component such as an actuator, a sensor, etc. Since the electrical conducting element is partially electrically insulated in the casing element, corresponding portions of the electrical conducting element are cut from the casing element, so that the electronic component of the motor vehicle can be connected to these portions of the electrical conducting element via the plug.

In order to provide a plug connecting element that can be used particularly efficiently and is particularly reliable, it is provided according to the invention that the electrical conducting element is connected to the casing element fixedly and non-detachably through primary forming of the plastic. This means that a particularly intimate connection exists between the electrical conducting element and the plastic of the casing element, the electrical conducting element being held in the casing element in such a manner that it can only be separated from the casing element by destroying the latter. This intimate connection between the electrical conducting element and the casing element means that foreign bodies, in particular liquids, are effectively prevented from coming into direct contact with the electrical conducting element, so that the electrical conducting element is particularly protected from spray water. Consequently, the plug connecting element according to the invention can be used particularly flexibly, as it can be used without any risk even in a wet region of a motor vehicle. A wet region of a motor vehicle should be understood to mean in this context a region of the motor vehicle which is not sealed to prevent the penetration of water or spray water, or is only sealed in a rudimentary manner, for example an engine compartment.

It has proved particularly advantageous for the plug connecting element to have at least one plug socket formed integrally along with the casing element, into which socket the plug of the electronic component of the motor vehicle can be inserted and, consequently, can be held detachably therein. On the one hand, the plug socket, which may also be referred to as the plug receptacle, is made particularly stable by this and, on the other hand, there is also no risk of the aforementioned spray penetrating the electrical conducting element at a transitional region where the plug socket and a main body of the casing element merge with one another. Furthermore, the plug connecting element can be used even more flexibly, since during the manufacture, in particular series manufacture, of the motor vehicle, plugs can be used which a corresponding motor vehicle manufacture already has in its range. Furthermore, this produces the advantage that a plug connected to the plug connecting element can once again be separated therefrom particularly easily and/or inexpensively, so that a plug connecting element that may be damaged can be replaced particularly easily and/or inexpensively.

Furthermore, it is advantageous that via the mechanical connection between the plug and the plug socket, the electrical contact between the electronic component and the ground point is mechanically stress-relieved. In other words, the electrical connecting element is at least substantially freed from the absorption of mechanical force, vibration and/or torque. This means that a dead weight of the cable harness and/or vibrations, etc. occurring when the motor vehicle is running do/does not have any effect at the electrical contact point, at least for the most part, but instead is/are absorbed via the mechanical connection between the plug and the plug socket. As a consequence, influences of this kind are advantageously absorbed by the plug connecting element, in particular via the casing element thereof, and conveyed to the component. Consequently, on the one hand, a risk of snapping and/or cable breakage is effectively prevented and, on the other hand, the plug is prevented from falling out of the plug socket due to the dead weight of the cable harness.

Furthermore, in order to advantageously prevent foreign bodies or liquids from coming into contact with the electrical conducting element via a plug socket space of the respective plug socket, the plug connecting element may have at least one sealing element which is provided between the plug socket and the plug. In particular, the at least one sealing element may be arranged on the plug side, so that due to an insertion of the plug into the plug socket, the plug socket space is sealed in respect of an environment thereof, particularly in a liquid-tight manner. Alternatively or in addition, a sealing element may be provided on the socket side which acts in a similar manner to the sealing element on the plug side. When using at least one sealing element on the plug side and a sealing element on the socket side configured separately therefrom, a particularly reliable seal of the plug socket space results. In addition, a dummy plug which is not attached to the electronic component may be provided which can be plugged into a plug socket assigned in each case instead of a plug. This is advantageous in order to seal an unoccupied plug position or a plug socket in which no plug is inserted. In this context, the dummy plug may be identical in design to the corresponding plug in terms of its geometry and dimensions. In particular, the dummy plug may interact with the sealing elements in a similar manner to the plug. Consequently, the sealing element on the plug side may be arranged at the dummy plug.

Moreover, it is advantageous in the case of the invention for the electrical conducting element to have a contact region cut from the casing element. In particular, this contact region is configured separately from portions of the electrical conducting element which are provided to produce an electrical connection between the electronic components of the motor vehicle and the electrical conducting element. On account of this, the plug connecting element may be particularly compact in design, since a separate contact element, for example a further plug socket for connecting the electrical contact element to the ground point, can be dispensed with.

In order to be able to produce a particularly reliable electrical contact between the electrical conducting element and the ground point of the motor vehicle, a connecting element fixedly held in the casing element and in contact with the electrical conducting element may be provided, via which the electrical conducting element and the ground point of the motor vehicle can be brought into electrically conductive contact with one another. In this case, a mechanical connection between the connecting element and the plastic of the casing element is of the same quality as the connection between the electrical conducting element and the plastic of the casing element. In other words, the connecting element and the casing element are connected to one another fixedly and non-detachably through the primary forming of the plastic. In particular, the electrical conducting element is arranged, or can be arranged, between the connecting element and the ground point, so that when the connecting element is fastened to the ground point by means of a fastening element, for example, the electrical conducting element is clamped, or can be clamped, between the connecting element and the ground point.

By means of a clamping force which can be applied, or is applied, to the casing element via the fastening element, the electrical conducting element is clamped to the ground point. With an arrangement of the plug connecting element at the ground point in which only the plastic of the casing element is clamped between the electrical conducting element and the ground point, this clamping force can disadvantageously diminish over time on account of a comparatively pronounced material settlement of the plastic, as a result of which the plug connecting element can become loose in relation to the ground point. Consequently, the connecting element particularly preferably has a substantially greater material hardness than the casing element. This means that a loss of clamping force of the fastening element can be counteracted, since as a result of the comparatively high material hardness of the connecting element, the connecting element has a substantially less pronounced material settlement. It is therefore possible to prevent the clamping force from diminishing to an unwanted degree on account of material settlement and the plug connecting element is relaxed and the plug connecting element can be held, and is held, at the ground point securely and reliably over time.

As a result of this, there is a particularly reliable mechanical contact between the ground point and the electrical conducting element and, as a consequence, the particularly reliable contact between the electrical conducting element and the ground point of the motor vehicle. It is particularly advantageous for the connecting element to comprise an electrically conductive material or to be at least substantially formed therefrom.

Furthermore, it may be provided that the connecting element is cut from the casing element, at least at a head bearing surface for a fastening element. Consequently, the plug connecting element can be connected to the ground point of the motor vehicle particularly reliably and, at the same time, a particularly reliable electrical connection between the electrical conducting element and the ground point of the motor vehicle can be established when the connecting element has an electrically conductive design. It is understood in this context that the fastening element has a dual function. Firstly, the plug connecting element can be mechanically fastened with the ground point, or to the ground point, by means of the fastening element. Secondly, particularly if the fastening element is electrically conductive, a particularly large contact area can be produced between the electrical conducting element and the ground point of the motor vehicle, so that the resistance between the electrical conducting element and the ground point is particularly small. In other words, the fastening element may bear directly against the connecting element and be fastened to a material of the ground point, so that an even more reliable electrical contact between the electrical conducting element and the ground point results.

In order to retain the connecting element in the plastic of the casing element in a particularly secure, stable and positionally-fixed manner, it may be provided that the connecting element has a fastening mechanism via which the connecting element is held in the casing element in a positionally-fixed manner. For example, an outer peripheral surface of the connecting element may exhibit means, for example a particularly uneven or irregular surface, undercuts, projections, material recesses, etc., which favor a mechanical connection between the connecting element and the plastic. Due to this fastening mechanism, it is possible to ensure that during primary forming of the plastic, an even more intimate connection is created between the connecting element and the casing element.

In order to support a positional arrangement of the plug connecting element at the ground point of the motor vehicle and in order to fix the plug connecting element in situ at the ground point in a particularly stable manner, the casing element may have a holding region via which the plug connecting element can be held in a positionally fixed manner at a holding element on the vehicle side which corresponds to the holding region. Hence, the plug connecting element can be positioned particularly easily with respect to the ground point.

It is particularly provided that the casing element is configured as an injection-molded component in which the electrical conducting element is partially molded. In this way, the plug connecting element can be produced particularly easily and/or inexpensively.

The invention further relates to a method for the production of a plug connecting element of this kind. Advantages and advantageous embodiments of the plug connecting element according to the invention should be regarded as advantages and advantageous embodiments of the method according to the invention for the production of a plug connecting element of this kind, and vice versa.

A method for producing the plug connecting element for a motor vehicle is proposed, in which an electrical conducting element to which at least one plug of an electric component of the motor vehicle can be connected, and a casing element made of plastic, through which the conducting element is at least partially electrically insulated, are connected to one another.

In order to provide a particularly flexibly useable plug connecting element which is particularly reliable, it is provided according to the invention that the electrical conducting element is fixedly and non-detachably connected to the casing element by primary forming of the plastic.

Further features of the invention result from the claims, the figures and the figure description. The features and combinations of features referred to above in the description and also the features and combinations of features referred to in the figure description below and/or simply in the figures can not only be used in the combination indicated in each case, but also in other combinations or in isolation.

The invention will now be explained in greater detail with the help of a preferred exemplary embodiment and also with reference to the drawings.

BRIEF DESCRIPTION OF THE DRAWINGS

Identical or functionally identical elements are provided with the same reference numbers in the figures.

DETAILED DESCRIPTION OF THE DRAWINGS

Figure 1:
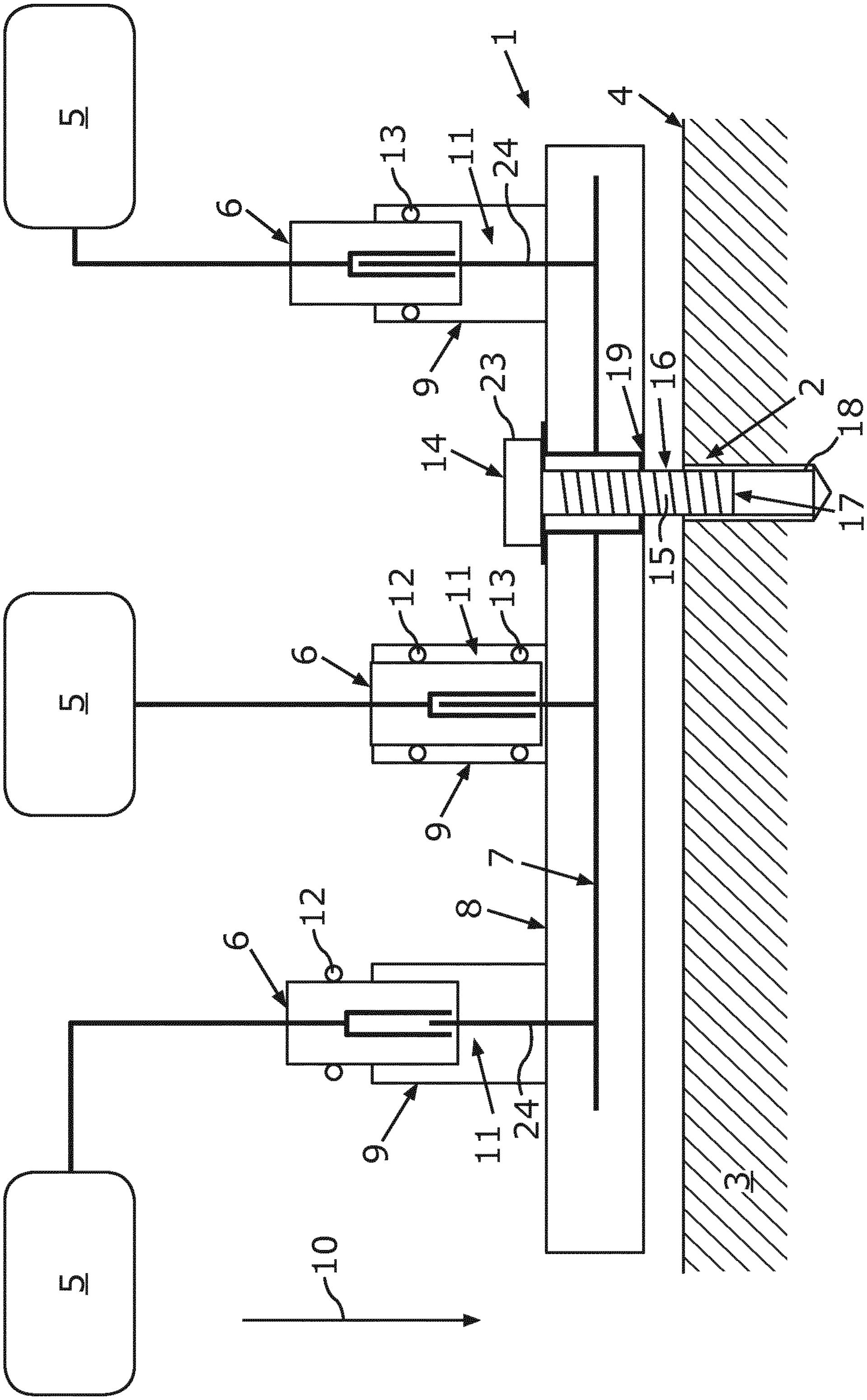
FIG. 1 shows as a schematic sectional representation a plug connecting element fastened to a ground point.

FIG. 1 shows as a schematic sectional representation a plug connecting element 1 which is fastened to a ground point 2. In particular, the plug connecting element 1 is used in a motor vehicle 3 which is not shown in full. In this case, the ground point 2 is formed by a metal and an electrically conductive component 4 of the motor vehicle 3. In particular, the metal component 4 may be an engine, for example, an internal combustion engine, of the motor vehicle 3. At least one electronic component 5 of the motor vehicle 3 may be connectable to the plug connecting element 1, in that a plug 6 of the electronic component 5 in each case assigned to the corresponding electronic component 5 or the corresponding electronic components 5 is connected to an electrical conducting element 7 of the plug connecting element 1. The electrical conducting element 7 may be configured as an electrically conductive board and/or have multiple elongate conducting elements which are arranged separately from one another and are electrically conductive, for example metal cores, cables, wires, etc. In particular, the plug connecting element 1 may comprise more than one electrical conducting element 7.

By way of example, three electronic components 5 are shown in FIG. 1 which are each connected, or connectable, to the plug connecting element 1 via a plug 6 in each case, in order to establish an electrically conductive connection between the respective electronic component 5 and the electrical conducting element 7. It should be understood, however, that precisely one electronic component 5, two electronic components 5, or more than three electronic components 5 may be present which can in this way be brought into electrical contact with the electrical conducting element 7.

FIG. 1 furthermore shows a casing element 8 which electrically insulates the electrical conducting element 7 at least partially. Accordingly, the casing element 8 comprises an electrically insulating material, for example plastic, or is at least substantially formed therefrom. In the event that a plurality of electrical conducting elements 7 is used, the electrical conducting elements 7 in each case can be insulated from one another by means of the plastic of the casing element 8 and at least partially electrically insulated in respect of an environment of the plug connecting element 1.

So that the plug connecting element 1 is particularly reliably configured, the electrical conducting element 7 and the casing element 8 are fixedly and non-detachably connected to one another by primary forming of the plastic. For example, the electrical conducting element 7 may be immersed in the initially at least substantially liquid or paste-like plastic, so that when the plastic hardens, the casing element 8 is formed and at the same time the fixed and non-detachable connection between the electrical conducting element 7 and the casing element 8 is produced. However, it is just as conceivable for the liquid or paste-like plastic to be arranged in a mold around the electrical conducting element 7, for example. Consequently, the casing element 8 is in particular an injection-molded component in which the electrical conducting element 7 is partially embedded, for example molded. Consequently, the electrical conducting element 7 is held therein in a positionally fixed manner with respect to the casing element 8 and can only be separated therefrom as a consequence of the destruction of the casing element 8, as soon as the plastic has properly hardened.

In addition, FIG. 1 shows at least one plug socket 9, in this case three plug sockets 9. The respective plug socket 9 at least corresponds to an assigned plug 6 and/or to an assigned dummy plug (not shown), so that when the plug 6 or the dummy plug is plugged into the respective plug socket 9, a force-fitting and/or form-fitting mechanical connection is established between the respective plug socket 9 and the plug 6 assigned in each case or the dummy plug assigned in each case. For better understanding, a plug-in direction 10 is shown in FIG. 1, wherein the respective plug socket 9 and the plug 6 assigned in each case, or else the dummy plug assigned in each case, are moved towards one another, for example in that the respective plug 6 is moved in the plug-in direction 10 towards the plug socket 9 and into the plug socket. It should be understood that the dummy plug in each case is identical in design to the corresponding plug 6 in terms of its shape and dimensions. This means that the plug 6 and the corresponding dummy plug are mutually exchangeable and fit in the same way into the correspondingly assigned plug socket 9.

As the respective plug 6 is moved into the respective plug socket 9, in other words into a plug socket space 11 formed by the corresponding plug socket 9 in each case, an electrical connection is produced between the electrical conducting element 7 and the corresponding electronic component 5 connected to the respective plug 6. In order to release this connection again in a non-destructive manner, the respective plug socket 9 and the respective plug 6 must be moved away from one another, for example in that the respective plug 6 is moved out of the respective plug socket 9 contrary to the plug-in direction 10.

The plug socket 9 in each case is integrally produced along with the casing element 8 during the primary forming of the plastic of the casing element 8. This means that during the injection molding of the plastic, the casing element 8 is produced along with the plug sockets 9 in a joint working step, so that the casing element 8 and the plug socket 9 are connected to one another in a substance-bonded manner.

In order to prevent foreign bodies or liquids, in particular electrically conductive or conducting liquids, from penetrating the respective plug socket space 11, at least one sealing element 12 is provided which, when the plug 6 or the dummy plug is in the plugged-in state, is arranged between the plug and the respective plug socket 9. In particular, the sealing element 12 may be a ring-shaped, for example toroidal, seal which is arranged between an outer peripheral surface of the corresponding plug 6, or of the corresponding dummy plug, and an inner peripheral surface of the corresponding plug socket 9, as soon as the plug 6 or the dummy plug is received in the corresponding plug socket 9. In other words, it may be provided that the sealing element 12 can be inserted, for example slid, into the corresponding plug socket 9, or into the corresponding plug socket space 11, along with the plug 6 or the dummy plug. This means that the sealing element 12 can be formed on the plug, or dummy plug, side. Alternatively or additionally, a sealing element 13 may be provided on the socket side, which sealing element functions in a similar manner to the sealing element 12 on the plug side or on the dummy plug side, but unlike this is arranged in the plug socket space 11 even before the corresponding plug 6 or dummy plug is actually moved into the corresponding plug socket space 11. In order to retain the sealing elements 12, 13 at the respective plug 6/dummy plug and/or at the respective plug socket 9, the sealing elements 12, 13 may be held in grooves in each case which are formed on the plug or dummy plug side and/or on the socket side. In this way, the sealing elements 12, 13 are effectively prevented from disengaging from their desired position, particularly when the plugs 6 or dummy plugs are connected to the plug sockets 9.

By means of a fastening element 14 which is configured as a threaded screw in the present example, the plug connecting element 1 is firstly mechanically fastened or fastenable to the motor vehicle 3, in particular to the component 4 of the motor vehicle 3. The fastening element 14 is electrically conductive in the present case, in other words it comprises an electrically conductive material or is at least substantially produced therefrom. A threaded portion 16 of the fastening element 14 or of the threaded screw which is provided with an outer thread 15 engages with a hole 17, thereby producing a threaded connection which has an inner thread 18 matching the outer thread 15. On the other hand, due to a screwing-in of the fastening element 14 which—as shown in FIG. 1—extends right through the casing element 8, a contact region 19 of the electrical conducting element 7 is clamped to the component 4 of the motor vehicle 3, as a result of which an electrically conductive connection between the electrical conducting element and the ground point 2 of the motor vehicle 3 is formed. For this purpose, the contact region 19 is cut from the casing element 8, so that a direct and immediate contact between the component 4, or the ground point 2, and the electrical conducting element 7 can be produced or is produced. It should be understood that to provide a better overview in FIG. 1, the component 4 and the plug connecting element 1 are depicted spaced apart from one another. However, it can easily be seen from the function known per se of the fastening element 14 configured as a threaded screw, how a direct contact is ultimately established between the contact region 19 or the electrical conducting element 7 and the component 4 or the ground point 2.

Alternatively, the fastening element 14 may comprise a stud bolt, in particular a headless stud bolt, exhibiting the outer thread 15 and a threaded nut exhibiting the inner thread 18. The stud bolt may project forwards from the component, in particular perpendicularly, at the ground point 2. The plug connecting element 1 can then be fastened to the component 4, in that the stud bolt connected to the component 4 is passed through the plug connecting element 1 and the threaded nut is then screwed onto a free end of the threaded bolt, and subsequently screwed tightly. The stud bolt may be integrally formed with the component 4.

Figure 2:
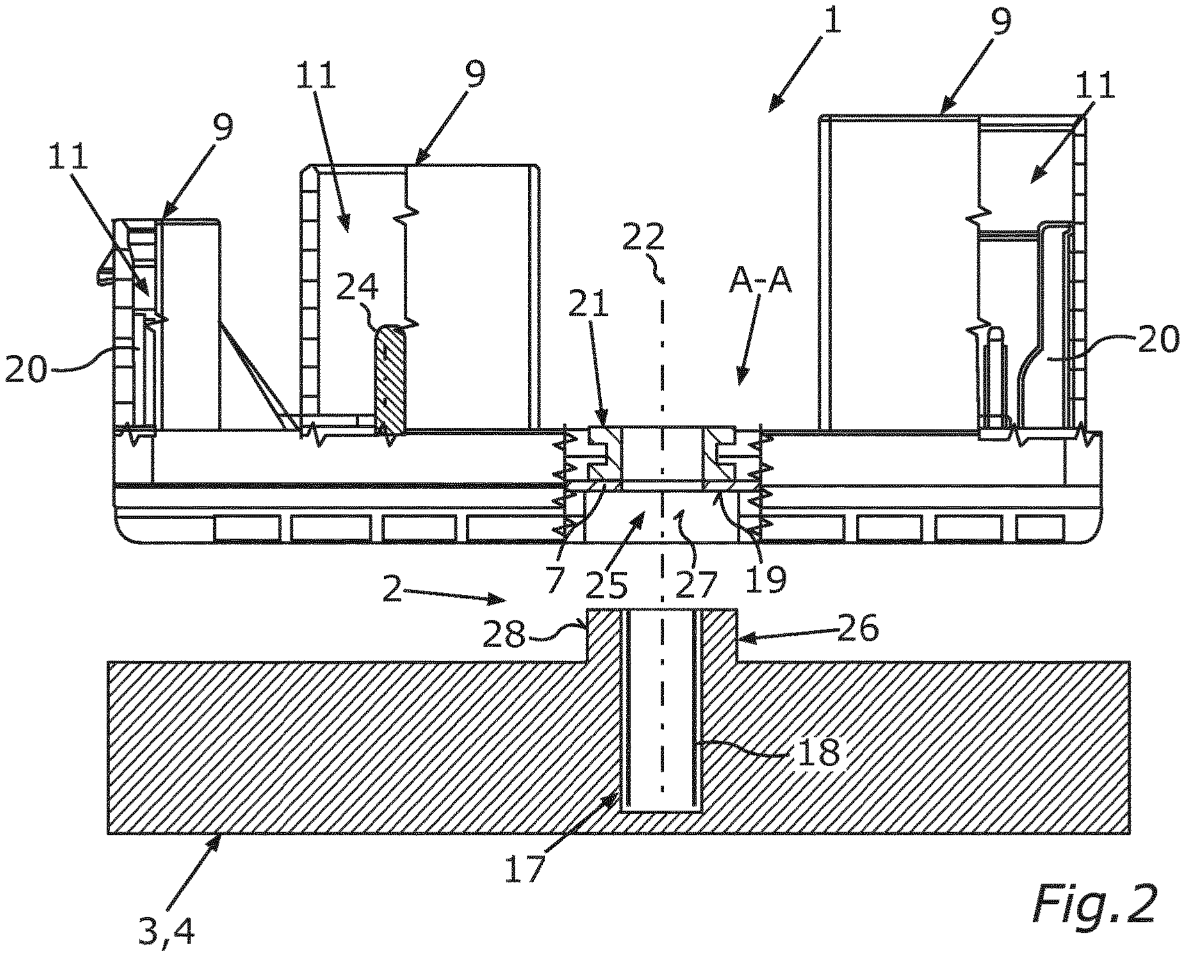
FIG. 2 shows as a partially sectional representation the plug connecting element which is remote from the ground point.

FIG. 2 shows a representation the plug connecting element 1 in part section, the plug connecting element being depicted spaced apart from the ground point 2 for reasons of clarity. The plug sockets 9 shown in this figure are partially depicted with auxiliary sections to provide the viewer with a glimpse into the respective plug socket space 11. It can be particularly recognized in this case that the respective plug socket spaces 11 each house coding elements 20 which correspond to matching (not shown) coding elements of the plugs 6, so that it can easily be ensured that only a predefined plug 6 can be inserted into a matching assigned plug socket 9. In other words, it is particularly easily guaranteed that a plug 6 cannot be accidently inserted into a non-assigned plug socket 9. In particular, the coding elements 20 are integrally formed along with the corresponding plug sockets 9 and, as a consequence, along with the casing element 8.

In a further auxiliary drawing section which runs along a sectional plane A-A (see FIG. 5), a connecting element 21 can be identified which is held fixedly and non-detachably in the casing element 8 or in the plastic of the casing element 8. The connecting element 21 can be produced particularly easily, in that it has a rotationally symmetrical design with respect to a longitudinal center axis 22 of the connecting element 21. The connecting element 21, which comprises an electrically conductive material or is at least substantially formed from an electrically conductive material of this kind, is in direct contact with the electrical conducting element 7, so that an electrically conductive connection prevails between the electrical conducting element 7 and the connecting element 21. If the fastening element 14 which is not shown in FIG. 2 is arranged through the connecting element 21 and, consequently, through the casing element 8 or through the plug connecting element 1 and into the hole 17 and clamped therein, for example screwed tightly therein, the electrical conducting element 7 which is in electrically conductive contact with the connecting element 21 can be brought, or is brought, into electrical contact with the ground point 2 via this connecting element and via the electrically conductive fastening element 14. To this end, a depth of the hole 17 and also a longitudinal extent of this fastening element 14 must each be selected in such a manner that the electrical conducting element 7 and/or the connecting element 21 is/are clamped between the ground point 2 or between the component 4 of the motor vehicle 3 and a head portion 23 (see FIG. 1) of the fastening element 14.

When FIG. 2 and FIG. 1 are viewed together, it can clearly be seen that the respective pins 24 of the respective plug sockets 9 are connected to the electrical conducting element 7 in an electrically conductive manner. This may mean that the electrical conductive element 7 comprises the respective pins 24. Alternatively or additionally, it may be provided that the respective pins 24 are integrally formed along with the electrical conducting element 7 and/or that the pins 24 are each connected to the electrical conducting element 7 in a substance-bonded manner.

The plug connecting element 1—as depicted in FIG. 2—has a holding region 25 via which the plug connecting element 1 or the casing element 8 can be held in a positionally fixed manner on a holding element 26 which corresponds to the holding region 25 on the vehicle side. It is provided for this purpose that the holding region 25 and the holding element 26 at least substantially correspond to one another in terms of their respective dimensions and geometries. The holding element 26 on the vehicle side, which projects beyond the component 4 or the engine of the motor vehicle 3, for example, is depicted. In particular, an inner peripheral surface 27 of the holding region 25 and an outer peripheral surface 28 of the holding element 26 may correspond to one another at least substantially in terms of their respective geometry and in terms of their respective dimensions, so that the holding element 26 can be plugged into the holding region 25 or the holding region 25 can be fitted onto the holding element 26, or vice versa. It is particularly conceivable for the inner peripheral surface 27 and the corresponding outer peripheral surface 28 each to have a cross section that differs from a circle or a circular ring, so that the plug connecting element 1 is held, or can be held, in a non-rotatable manner in relation to the component 4 as soon as the holding element 26 and the holding region 25 interact with one another. It may be provided that the holding element 26 has an excess in relation to the holding region 25 or vice versa, so that when the holding element 26 and the holding region 25 are brought together, a force-fitting or frictional connection is produced between the component 4 and the plug connecting element 1.

Figure 3:
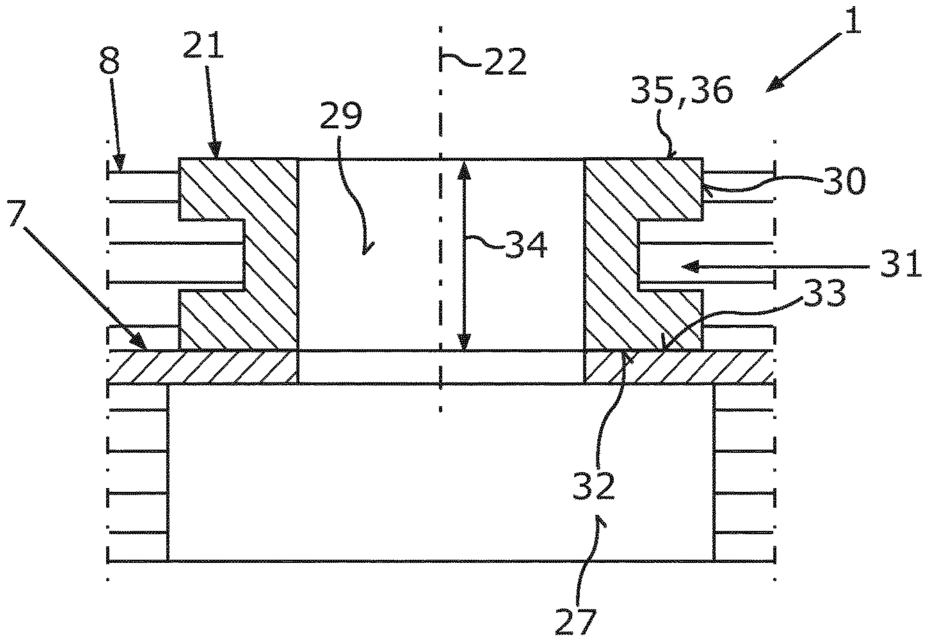
FIG. 3 shows as a sectional representation a casing element, a connecting element, and an electrical conducting element of the plug connecting element.

The connecting element 21 is described in greater detail below; in relation to this, FIG. 3 shows as a sectional representation the casing element 8, the connecting element 21, and the electrical conducting element 7 of the plug connecting element 1. It can be seen particularly clearly in FIG. 3 that the connecting element 21 abuts the electrical conducting element 7 directly and immediately, so that the connecting element 21 and the electrical conducting element 7 are in direct contact. Since, as has already been described, both the electrical conducting element 7 and the connecting element 21 are each configured in an electrically conductive manner, the connecting element 21 and the electrical conducting element 7 are in electrically conductive contact with one another.

In the present example, the connecting element 21 has a rotationally symmetrical design with respect to the longitudinal center axis 22. The connecting element 21 therefore has an annular-shaped cross section along the longitudinal center axis 22, so that an inner peripheral area 29 of the connecting element 21 represents a straight circular cylinder. In other words, the connecting element 21 follows a straight annular-shaped cylinder, at least substantially. An outer peripheral surface 30 of the connecting element 21 has a fastening mechanism 31 which is configured as a material recess in the present example which extends radially starting from the outer peripheral surface 30 in the direction of the longitudinal center axis 22. In this way, during the primary forming or injection-molding of the plastic of the casing element 8 it is ensured that the plastic penetrates the fastening mechanism 31 or the material recess and engages therein, as a result of which the connecting element 21 is held in the casing element 8, or in the plastic thereof, in a particularly reliable and positionally stable manner as soon as the plastic has hardened and, as a consequence, the casing element 8 is produced. Alternatively or in addition, it is conceivable for the fastening mechanism 31 to have a material projection which extends starting from the outer peripheral surface 30 in a direction away from the longitudinal center axis 22. An effect of this kind securing the position of the connecting element 21 in the casing element 8 is in any event guaranteed by a discontinuously or unevenly configured outer peripheral surface 30 and/or by a particularly rough outer peripheral surface 30.

The fastening mechanism configured as a material recess further provides a sealing effect, since because the plastic of the casing element 8 extends at least sectionally into the material recess, a labyrinth sealing effect is produced. In this way, moisture is prevented from creeping from outside into and along a joint between the plastic and the material of the connecting element 21 and finally making unwanted direct contact with the electrical conducting element 7.

The connecting element 21 abuts the electrical conducting element 7 via a first end face 32 directly on a bearing surface 32 of the electrical conducting element. A second end face 35 opposing or opposite the first end face 32 along the longitudinal center axis 22 and spaced apart therefrom by a longitudinal extent 34 forms a head bearing surface 36 for the fastening element 14 or for the head portion 23 thereof. For this purpose, the second end face 35 or the head bearing surface 36 is cut from the casing element 8.

In the case of a further exemplary embodiment, the connecting element 21 and the electrical conducting element 7 can be in electrically conductive or conducting contact with one another, in that a portion of the outer peripheral surface 30 running at least substantially parallel to the longitudinal center axis 22 and a portion of the electrical conducting element 7 opposite this portion are directly or immediately in contact in planar fashion. In this case, the connecting element 21 completely penetrates the plastic of the casing element 8, in other words the two end faces 32, 35 are exposed, so that the connecting element 21 is in direct contact with the component 4, in particular the holding element 26, as soon as the plug connecting element 1 is functionally connected to the component 4.

The end face 32 may have a structure that differs from a smooth or even surface and/or may be arranged obliquely with respect to the longitudinal center axis 22. If the holding element 26 has a structure corresponding to the end face 32 and/or a profile corresponding to the end face 32 in relation to the longitudinal center axis 22, a positioning aid is thereby created when the plug connecting element 1 is arranged on the component 4. This is because the structures of the end face 32 and of the holding element 26 which correspond to one another can interact in a force-fitting and/or form-fitting manner, for example mesh with one another. In addition, a securing mechanism to prevent accidental twisting of the plug connecting element 1 in relation to the component 4 is then created.

In order to create an electrically conductive connection between the respective electronic component 5 and the ground point 2 by means of the plug connecting element 1, in one step the corresponding plug 6 assigned to the electronic component 5 is plugged into the plug socket 9 assigned thereto, so that an electrically conductive connection is made between the pin 24 and the portion of the electronic component 5 being connected. Alternatively, the corresponding plug socket 9 can be fitted onto the corresponding plug 6 for this purpose. Since the pin 24 is connected to the electrical conducting element 7 in an electrically conductive manner and/or the electrical conducting element 7 comprises the pin 24, so that they are connected to one another in a substance-bonded manner, the bringing-together of the plug 6 and the corresponding plug socket 9 means that the corresponding electronic component 5 is connected to the electrical conducting element 7 in an electrically conductive manner, so that it is possible for an electric current to flow between the electrical conducting element 7 and the electronic component 5.

In a preceding or subsequent further step, the plug connecting element 1 is connected to the component 4 and, as a consequence of this, to the ground point 2, in that the plug connecting element 1 is clamped via the casing element 8 between the component 4 or the ground point 2 and the head portion 23 of the fastening element 14. Since the fastening element 14 is particularly configured as a threaded screw, it is arranged through the plug connecting element 1 or through the casing element 8 and into the hole 17 formed in the component 4, particularly screwed into the hole 17, thereby creating the threaded connection between the outer thread 15 and the inner thread 18. In this way, on the one hand the plug connecting element 1 is held particularly securely at the component 4 and, on the other hand, a particularly reliable electrically conductive connection is made between the contact region 19 which is connected to the electrical conducting element 7 in an electrically conductive manner and/or is an integral constituent of the electrical conducting element 7 and the ground point 2. Consequently, the electronic component 5 is connected to the ground point 2 via the plug 6, via the plug socket 9, via the electrical conducting element 7 and via the contact region 19.

In order to achieve a particularly reliable electrically conductive connection between the electronic component 5 and the ground point 2, it is further provided that the fastening element 14, as already described, is electrically conductive, so that between the electrical conducting element 7 and the ground point 2, or the component 4, the electrical connection is made via the head bearing surface 36 or the end face 35 and via the fastening element 14 itself, insofar as the fastening element 14 or the threaded screw is introduced or screwed into the hole 17. Accordingly, a current starting from the electronic component 5 can flow via the pin 24 and via the electrical conducting element 7 through the connecting element 21 and, further on, via the head bearing surface 36 into the fastening element 14 and finally out of the fastening element 14, in particular in the region of the inner thread 18, and into the component 4 or the engine of the motor vehicle 3.

Figure 4:
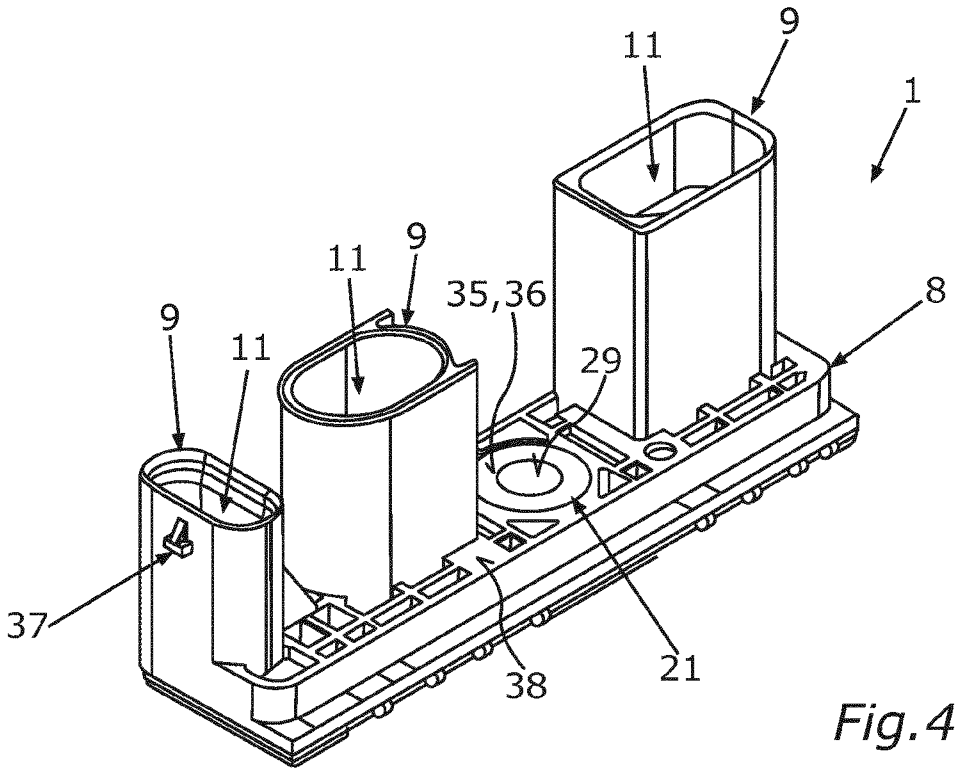
FIG. 4 shows the plug connecting element as a schematic and perspective representation.

FIG. 4 shows the plug connecting element 1 in a schematic and perspective representation, wherein it is particularly easy to identify how the second end face 35, or the head bearing surface 36, is cut from the casing element 8. Furthermore, a locking element 37 is shown which is designed to engage with a corresponding locking element socket (not shown), wherein the locking element 37 is arranged on the respective plug socket 9 and the respective locking element socket on a plug 6 not shown in FIG. 4. In this way, it is particularly easy to ensure that the plug 6 inserted in the plug socket 9 is secured to prevent unwanted movement out of the plug socket space 11.

Figure 5:
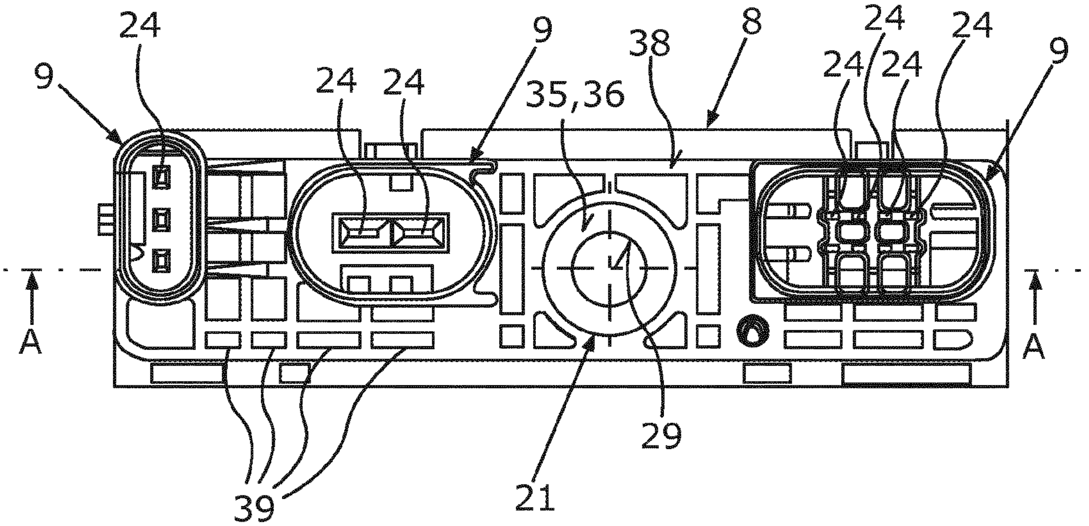
FIG. 5 shows the plug connecting element in plan view.

FIG. 5 shows in plan view the plug connecting element 1, wherein the pins 24 extend perpendicularly to the drawing plane in the direction of an observer of FIG. 5. In order to configure the plug connecting element 1 in a particularly ground-efficient manner, a plurality of material recesses 39 is formed on a surface 38 of the casing element 8. Through the material recesses 39 it is furthermore made possible for the plug connecting element 1 to be produced in a particularly material-efficient manner, while the plug connecting element 1 nevertheless still satisfies predefined criteria in respect of stability, bend resistance, etc.

The invention shows overall that unlike a traditional plug connecting element the plug connecting element 1 can be used in a particularly flexible manner and is particularly reliable. Furthermore, the plug connecting element 1 is particularly easy to apply to and/or in the motor vehicle 3, since via the fastening element 14, on the one hand, the mechanical connection between the plug connecting element 1 and the component 4 and, on the other hand, the electrical connection between the electrical conducting element 7 and the ground point 2, is achieved. For this purpose, only the fastening element 14, which may be configured by way of example as the threaded screw, as a stud bolt/threaded nut combination described above, as a rivet, as an electrically conductive adhering connection, etc., can be used as designated. Furthermore, it is made possible by means of the plug connecting element 1 according to the invention for the plug 6 to be used to actively connect the corresponding electronic component 5 to the ground point 2. This is advantageous since plugs 6 can be used which are in any event included in the range of a manufacturer of the motor vehicle 3. Consequently, a number of plugs 6 with different designs can be reduced and a particularly efficient modular system can be established.

A particular advantage of the plug connecting element 1 should be regarded as being that traditional crimp connectors or cable harnesses are rendered obsolete during the manufacture, or series manufacture, of the motor vehicle 3, since a reliable ground connection between the corresponding electronic component 5 and the ground point 2 is made by inserting a corresponding plug 6 into an assigned plug socket 9 when the plug connecting element 1 is fastened to the component 4 according to the measures described herein. In this way, particular account is taken of a basic idea of an at least partially automated production of the motor vehicle 3.

LIST OF REFERENCE NUMBERS

1 plug connecting element
2 ground point
3 motor vehicle
4 component
5 electronic component
6 plug
7 conducting element
8 casing element
9 plug socket
10 plug-in direction
11 plug socket space
12 sealing element
13 sealing element
14 fastening element
15 outer thread
16 thread portion
17 hole
18 inner thread
19 contact region
20 coding element
21 connecting element
22 longitudinal center axis
23 head portion
24 pin
holding region
26 holding element
27 inner peripheral surface
28 outer peripheral surface
29 inner peripheral surface
outer peripheral surface
31 fastening mechanism
32 end face
33 bearing surface
34 longitudinal extent
end face
36 head bearing surface
37 locking element
38 surface
39 material recess

What is claimed is:

1. A plug connecting element of a motor vehicle, comprising:
at least one electrical conducting element to which at least one plug of an electric component of the motor vehicle is connectable;
a casing element made of plastic, by which the electrical conducting element is electrically insulated, wherein
the electrical conducting element is connected to the casing element fixedly and non-detachably through primary forming of the plastic; and
a connecting element fixedly held in the casing element and in contact with the electrical conducting element, via which the electrical conducting element and a ground point of the motor vehicle are brought into electrically conductive contact with one another, wherein the connecting element is cut from the casing element at least at a head bearing surface for a fastening element.

2. The plug connecting element according to claim 1, further comprising:
at least one plug socket formed integrally along with the casing element, into which plug socket the plug of the electronic component of the motor vehicle is insertable and, when inserted, held detachably therein.

3. The plug connecting element according to claim 2, further comprising:
at least one sealing element provided between the plug socket and the plug.

4. The plug connecting element according to claim 1, wherein
the electrical conducting element has a contact region cut from the casing element.

5. The plug connecting element according to claim 1, wherein
the connecting element has a fastening mechanism via which the connecting element is held in the casing element in a positionally-fixed manner.

6. The plug connecting element according to claim 1, wherein
the casing element has a holding region, via which the plug connecting element is held in a positionally-fixed manner at a holding element on a vehicle side which corresponds to the holding region.

7. A method for producing a plug connecting element for of a motor vehicle having an electrical conducting element to which at least one plug of an electric component of the motor vehicle is connectable, the method comprising:
connecting a casing element to the electrical conducting element, the casing element being made of plastic so as to electrically insulate the electrical conducting element, wherein the connecting of the electrical conducting element to the casing element is carried out through primary forming of the plastic such that the electrical conducting element is connected to the casing element fixedly and non-detachably and such that a connecting element is fixedly held in the casing element and is in contact with the electrical conducting element, wherein the connecting element is cut from the casing element at least at a head bearing surface for a fastening element.

* * * * *